UNITED STATES PATENT OFFICE.

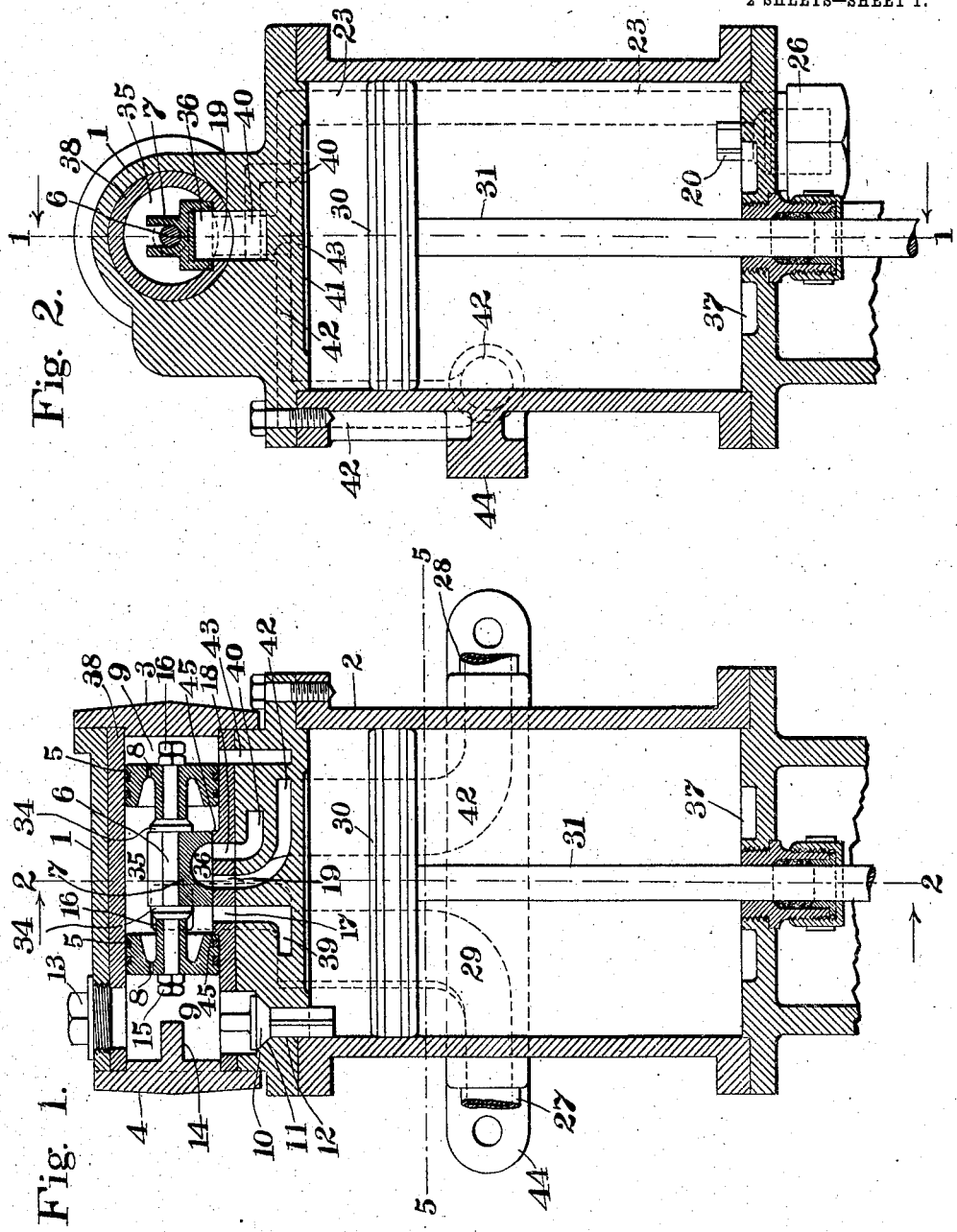

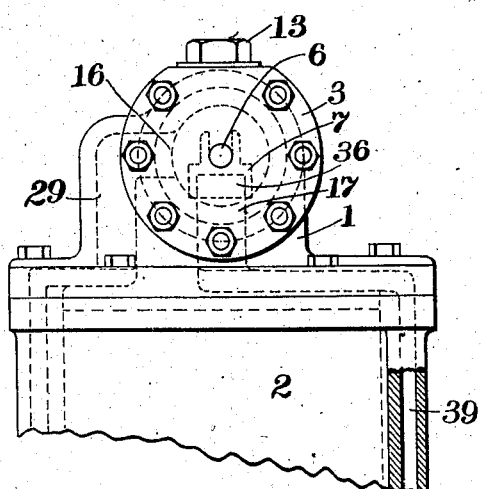
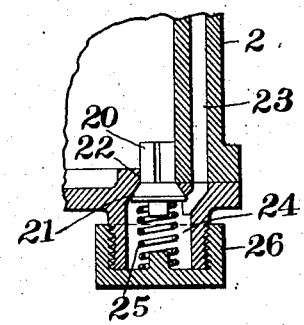
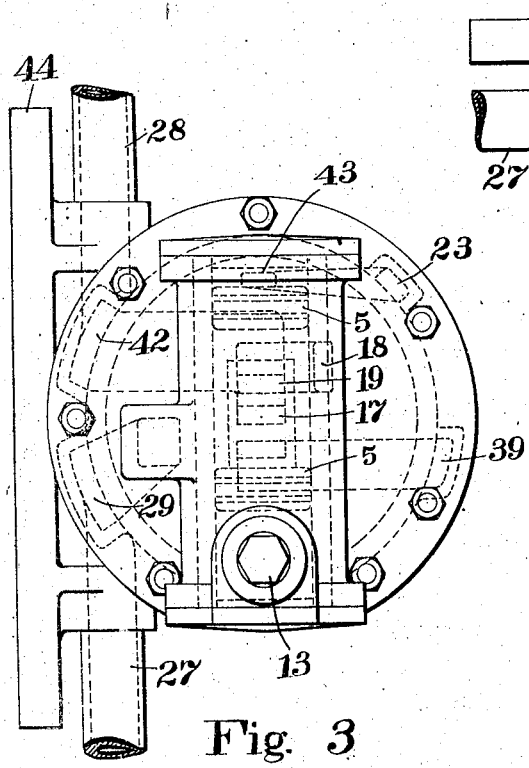
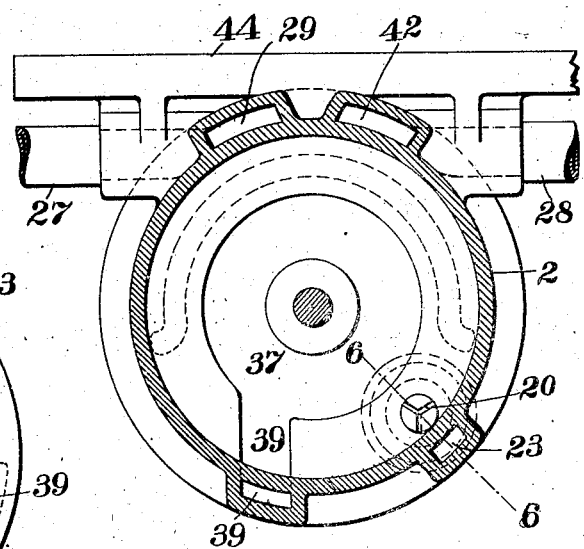

WALTER V. TURNER, OF TOPEKA, KANSAS, ASSIGNOR TO THE WESTINGHOUSE AIR BRAKE COMPANY, OF PITTSBURG, PENNSYLVANIA, A CORPORATION OF PENNSYLVANIA.

STEAM OR OTHER FLUID PRESSURE MOTOR.

No. 833,809.      Specification of Letters Patent.      Patented Oct. 23, 1906.

Application filed January 29, 1903. Serial No. 141,055.

*To all whom it may concern:*

Be it known that I, WALTER V. TURNER, a citizen of the United States, residing at Topeka, Shawnee county, State of Kansas, have invented certain new and useful Improvements in Steam or other Fluid Pressure Motors, of which the following is a specification.

My invention relates to improvements in steam or other fluid pressure actuated motors, and particularly in the valve mechanism thereof, which improvements are especially applicable to motors for use in connection with air-compressors employed in fluid-pressure railway-brake mechanism, the special object of my invention being to provide an improved steam-actuated valve mechanism for a self-contained motor which will be certain, quick, and positive in action, which will operate with the minimum expenditure of actuating fluid for shifting the valve in order to change the admission and exhaust functions of the cylinder-ports, and which, moreover, shall be simple in construction, possessing the smallest number of parts, arranged in the most compact manner and readily accessible for repairs and durable in use.

With these objects in view my invention consists in the novel construction of steam or other fluid pressure actuated motor and in the details thereof, as hereinafter described with reference to the accompanying drawings and more particularly pointed out in the claim.

In the drawings, Figure 1 is a vertical section of a steam-pump motor or engine embodying my invention on the line 1 1, Fig. 2, looking in the direction of the arrows. Fig. 2 is a similar view on the line 2 2, Fig. 1. Fig. 3 is a top plan view thereof. Fig. 4 is an end view of the valve-chamber. Fig. 5 is a transverse section on the line 5 5, Fig. 1; and Fig. 6 is a detail in section on the line 6 6, Fig. 5.

Referring now to the drawings, in which the same reference characters relate to the same or corresponding parts in all the views, the cylinder 2, having therein a reciprocating piston 30, connected by a stem 31 to the piston of the air-compressor cylinder or other like device, (not shown,) is provided with a head which is chambered to form a valve-chamber 1, such head having cored passages for steam and exhaust ports, as hereinafter described. This head is bolted in a suitable manner to the cylinder and is closed by the end plates or valve-chamber covers 3 and 4. Within the valve-chamber is a D slide-valve 7, confined to a stem or rod 6 by shoulders 34, which stem also carries two pistons 5, confined between the shoulders 34 on the rod or stem 6 and the nuts 15 and equidistant from the opposite ends of the valve, each suitably packed to provide a proper separation of the steam-space 35 from the end spaces 9, the latter constituting equalizing-chambers communicating with the central steam-space by restricted ports or passages 8, preferably located in each of the pistons. Movement of the equalizing-pistons, and hence the slide-valve, is limited in one direction by contact of the left-hand piston with a shoulder 45 on the bushing 38, with which the chamber is preferably lined, while in the other direction it is limited by contact of the right-hand piston with a similar shoulder and also by contact of the nuts 15 on the rod 6 or the end of the rod with a stud or post 14, projecting from the inner side of the head or end plate 4.

The steam-pipe 27 communicates, through a suitable cored passage or conduit 29 in the wall of the cylinder, with a live-steam port 16, opening into the steam-space 35, intermediate of the ends of the valve-chamber and between the two equalizing-pistons, thus constantly supplying the steam-chest with live steam or other motive fluid as long as the same is supplied to the pipe 27. A port 17, opening into the steam-chest 35, communicates, through a cored passage 39 in the cylinder-wall, with the lower end of the cylinder, said passage terminating in a groove or recess 37 in the lower cylinder-head, while a port 18, opening into the said steam-chest 35, communicates, through a cored passage 40 in the upper cylinder-head, with the upper part of the cylinder, such passage terminating in a recess 41 in said head. Located between the two ports 17 and 18 is an exhaust-port 19, always in register with the exhaust-cavity 36 of the slide-valve and forming the termination of a cored passage 42, always open to the atmosphere through the exhaust-pipe 28.

An exhaust or relief port 12, normally closed by a relief-valve 10, seated against the seat 11, connects the left-hand equalizing-chamber 9 with the cylinder above the piston 30, a screw-plug 13 closing an opening in the valve-chamber in alinement with said relief-valve to permit ready insertion and removal of said valve into and from its place and for grinding in. The right-hand equalizing-chamber is connected to the cylinder below the piston 30 by a port 43, communicating with a cored passage or conduit 23, which terminates in a relief-valve chamber 24 on the lower cylinder-head, communicating with the lower part of said cylinder through a relief-port 22, normally closed by a relief-valve 20, held against its seat 21 by a spring 25, confined between said valve and a cap 26, which closes the relief-valve chamber. Both relief-valves have their stems projecting into the cylinder a sufficient distance to be engaged by the piston 30 as it approaches either end of its stroke, whereby said valves are moved from their seats by the piston to permit of exhaust from either equalizing-chamber 9 into and through the exhaust end of the main cylinder, as the case may be.

Forming part of the cylinder structure is a supporting-bracket structure 44, provided with suitable bolt-holes or other attaching means for securing the device in preferably a vertical position on the locomotive or other place, and the live-steam and exhaust conduits 29 and 42 are preferably formed in said structure and form continuations of corresponding conduits or passages in the cylinder-wall.

With the parts in the position shown in the drawings, where the piston is moving toward the upper end of the main cylinder, the throttle (not shown) being opened to supply steam through the pipe 27, the motive fluid passes through the conduit 29 and enters the steam-chest 35 through the port 16, filling the same, and passing through the equalizing-passages 8 in the pistons 5 it fills the valve-chamber on both sides of the pistons 5 with the fluid at the maximum pressure, both relief-valves 10 and 20 being closed. At the same time the steam or motive fluid passes through the port 17 into the conduit or passage 39 and through the latter into the lower end of the cylinder, the piston being started upward when at the lower end of its stroke by the steam filling the groove 37. Motive fluid exhausts from above the piston as the latter is forced upward through the passage 40, port 18, exhaust-cavity 36, port 19, and conduit 42 into the pipe 28. With this stroke of the piston air is compressed above the air-compressing piston in the air-cylinder, and on the downstroke of the motor-piston air is compressed on the lower side of the said air-compressing piston, as will be readily understood. As the piston 30 approaches the end of its upward stroke it will contact with and raise the relief-valve 10, thereby opening the left-hand equalizing-chamber 9 to the exhaust through the port 12, the upper part of the cylinder 2 above the piston 30, passage 40, port 18, cavity 36, port 19, passage 42, and pipe 28, by which exhaust of motive fluid the left-hand piston becomes unbalanced, the pressure on both sides of the right-hand piston remaining equalized, thus permitting the live-steam pressure on the right side of said left-hand piston to move the same, and hence the whole valve structure, to the left, thereby shifting the admission and exhaust ports of the cylinder. The slide-valve 7 now opens the port 18 to the steam-space, connects the port 17 with the exhaust-port 19, so that steam passes through the port 18 and passage 40 into the recess 41 in the upper head of the cylinder and forces the piston downward, the relief-valve 10 seating and closing the exhaust from the left-hand equalizing-chamber 9 as soon as the piston moves out of contact with its stem, and equalization on both sides of the piston 5 is again established. The steam is exhausted from the lower end of the cylinder through the passage or conduit 39, the port 17, the cavity 36, port 19, passage 42, and pipe 28, such action continuing until the piston approaches the end of its downward stroke, where it contacts with the stem of the valve 20, moving it from its seat and opening the right-hand equalizing-chamber 9 to the exhaust through the passage or conduit 23, chamber 25, port 22, through the cylinder, passage 39, port 17, cavity 36, port 19, passage 42, and pipe 28, thus relieving pressure on the right side of the right piston 5, thereby unbalancing the same, pressure on the left-hand piston remaining equalized and permitting pressure on the left side of the said right-hand piston to force the same to the right, thus shifting the admission and exhaust ports of the cylinder and completing the cycle of operation.

It will be observed that the operation of my improved valve mechanism is simple and effective, and as the valve structure is balanced while the piston is making its stroke it remains in proper position while the piston is moving and until the piston approaches the end of its stroke, when the relief-valve at that end is positively moved by the piston, permitting an exhaust of pressure from its connected equalizing-chamber, resulting in a reduction of pressure on one side of the piston, thus unbalancing the pressure sufficiently to permit the normal pressure of steam on the other side of that particular piston to shift the valve, and thus change the functions of the cylinder-ports. This shifting of the valve is therefore accomplished with the least possible expenditure of motive fluid, and the action is certain and effective.

It will also be observed that the parts of my improved steam-actuated motor are so compact that the structure is self-contained, occupying the least space and possessing the greatest durability, while the parts are readily accessible for repairs.

It will be understood that while my improved motor is mainly designed for use as a motor for driving an air-compressor, particularly in an air-brake system, and steam is the preferred motive fluid it is not limited to this particular use or motive fluid, and where steam is used in the specification and claims I mean to include any suitable motive fluid.

I claim as my invention—

A fluid-pressure motor comprising an upright cylinder and piston, a valve-chamber having a valve-seat with admission and exhaust ports for said cylinder, a valve in said chamber for controlling said ports, a pressure-operated abutment for actuating the valve, equalizing-chambers on opposite sides of said abutment, ports connecting the equalizing-chambers with the opposite ends of the cylinder, a gravity tappet relief-valve for the port to the upper end of the cylinder, and a spring-pressed tappet relief-valve for the port to the lower end of the cylinder.

In testimony whereof I have signed my name to this specification in the presence of two subscribing witnesses.

WALTER V. TURNER.

Witnesses:
P. H. Donovan,
Chas. E. Gayer.